(12) United States Patent
Wu et al.

(10) Patent No.: US 12,313,494 B1
(45) Date of Patent: May 27, 2025

(54) GEAR FAULT DIAGNOSIS METHOD BASED ON JOINT WEIGHTED ENVELOPE NOISE-RESISTANT CORRELATION OF SUB-SIGNALS

(71) Applicants: ZHEJIANG UNIVERSITY, Zhejiang (CN); ZHEJIANG LAB, Hangzhou (CN)

(72) Inventors: Dazhuan Wu, Hangzhou (CN); Yaochun Hou, Hangzhou (CN); Tian Xiang, Hangzhou (CN); Peng Wu, Hangzhou (CN); Bin Huang, Hangzhou (CN); Shuai Yang, Hangzhou (CN)

(73) Assignees: ZHEJIANG UNIVERSITY, Hangzhou (CN); ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/932,720

(22) Filed: Oct. 31, 2024

Related U.S. Application Data

(63) Continuation of application No. PCT/CN2023/130918, filed on Nov. 10, 2023.

(51) Int. Cl.
  *G01M 13/021* (2019.01)
  *G01M 13/028* (2019.01)

(52) U.S. Cl.
  CPC ........ *G01M 13/021* (2013.01); *G01M 13/028* (2013.01)

(58) Field of Classification Search
  CPC .......................... G01M 13/021; G01M 13/028
  See application file for complete search history.

(56) References Cited

U.S. PATENT DOCUMENTS

| | | | |
|---|---|---|---|
| 2008/0114553 A1 | 5/2008 | Morel | |
| 2022/0011763 A1* | 1/2022 | Negri | G05B 23/0221 |
| 2024/0393210 A1* | 11/2024 | Nair | G01M 13/04 |

FOREIGN PATENT DOCUMENTS

| | | |
|---|---|---|
| CN | 101634605 A | 1/2010 |
| CN | 110146282 A | 8/2019 |

(Continued)

OTHER PUBLICATIONS

International Search Report (PCT/CN2023/130918); Date of Mailing: Aug. 5, 2024 (11 pages).

(Continued)

*Primary Examiner* — Lisa M Caputo
*Assistant Examiner* — Cynthia L Davis
(74) *Attorney, Agent, or Firm* — Wiersch Law Group

(57) ABSTRACT

A gear fault diagnosis method based on joint weighted envelope noise-resistant correlation of sub-signals, comprising: converting an original vibration signal sequence into an envelope signal through a signal sequence element-wise squaring-low-pass filtering-square root computation process, reconstructing the envelope signal according to different time intervals to obtain a series of sub-signals, calculating a fault information representation measure of each sub-signal based on an L-moment theoretical index, assigning a weight to each sub-signal with Sigmoid transformation, calculating a joint weighted envelope noise-resistant correlation function of the envelope signal sequence and the reconstructed sub-signals based on the envelope signal, the reconstructed sub-signals and the corresponding weights thereof, and determining a characteristic frequency according to a reciprocal of a time interval value corresponding to the characteristic peak in a plot of the joint weighted envelope noise-resistant correlation function with the time interval to eventually identifying a gear fault.

9 Claims, 4 Drawing Sheets

(56) References Cited

FOREIGN PATENT DOCUMENTS

| CN | 112613547 A | * | 4/2021 | ........... G06F 18/214 |
|---|---|---|---|---|
| CN | 114118172 A | | 3/2022 | |
| CN | 116242605 A | | 6/2023 | |
| CN | 116907838 A | | 10/2023 | |
| CN | 117648560 A | | 3/2024 | |

OTHER PUBLICATIONS

Zhang Yan-min: "Domain Adaptive Gearbox Fault Diagnosis Based on Soft Joint Maximum Mean Difference", Machinery Design & Manufacture, [Issue]: 10, Oct. 31, 2023, pp. 50-64.

A periodic-modulation-oriented noise resistant correlation method for industrial fault diagnostics of rotating machinery under the circumstances of limited system signal availability, ISA Transactions, vol. 151, 2024, pp. 258-284, https://doi.org/10.1016/j.isatra.2024.05.051.

* cited by examiner

GEAR FAULT DIAGNOSIS METHOD BASED ON JOINT WEIGHTED ENVELOPE NOISE-RESISTANT CORRELATION OF SUB-SIGNALS

CROSS-REFERENCE TO RELATED APPLICATIONS

The present application is a continuation of International Application No. PCT/CN2023/130918, filed on Nov. 10, 2023, the content of which is incorporated herein by reference in its entirety.

TECHNICAL FIELD

The present disclosure relates to the field of condition monitoring and fault diagnosis of rotating machinery gearbox device, and in particular, to a gear fault diagnosis method based on joint weighted envelope noise-resistant correlation of sub-signals.

BACKGROUND

A gearbox mainly includes a shell, gears, rolling bearings, shafts, fixed parts, sealing parts and other elements, and it is the most commonly used variable speed transmission component of various large-scale rotating machinery such as wind turbines, rotary compressors and steam turbines. On the one hand, the quality, running smoothness and noise of the gearbox are important indicators for reflecting the quality of machinery manufacturing, and according to statistical data, the main reasons for the failures of various mechanical transmission systems are the deficiencies in design, manufacturing and maintenance. On the other hand, due to the long-term working under the harsh operating conditions of high speed and heavy load, various faults may occur, which may lead to the decline of machine performance and the catastrophic accident at the system level. Accordingly, in order to improve the reliability of gearbox operation, in one aspect, the quality of design, manufacture and assembly should be improved, and in another aspect, the level of operation and maintenance should be improved, real-time monitoring and fault diagnosis of gearbox operation should be carried out, the early faults of gearbox gears should be checked in time and measures should be taken, which can effectively improve the prognosis and health management level of the equipment, thus ensuring industrial safety and stable production, which has extremely significant practical engineering significance.

Due to some characteristics of structure and working principle, the vibration signal of the gearbox is very complex, and there is a need to make analysis in time domain and frequency domain at the same time when carrying out fault diagnosis. The characteristic frequency of a gear failure in the gearbox is basically composed of two parts: one is a carrier signal composed of gear meshing frequency and the harmonics thereof, the other one is a modulated signal composed of the amplitude and phase changes of low-frequency components (mainly the speed frequency of the shaft where the fault gear is located), and the modulated signal includes amplitude modulation and frequency modulation. The following summary lists the frequency spectrum and waveform characteristics of the gear failure in the gearbox:

(1) the existence of shaft frequency and its higher harmonics;
(2) the existence of gear meshing frequency and its higher harmonics;
(3) taking the gear meshing frequency and its harmonics as the carrier frequency, and the shaft rotation frequency of the gear and its multiples as the modulation frequency to form the meshing frequency sidebands;
(4) taking the natural frequency of the gear and its harmonics as the carrier frequency, and the shaft rotation frequency of the gear and its multiples as the modulation frequency to form the sidebands; and
(5) taking the natural frequency of the gearbox and its harmonics as the carrier frequency, and the shaft rotation frequency of the gear and its multiples as the modulation frequency to form the sidebands.

Generally speaking, several frequency modulation carriers of a gearbox gear failure are: gear meshing frequency, gearbox natural frequency and gear natural frequency. The amplitude or power spectrum of Gahanning window is generally used in spectrum analysis. Because of the complexity of gear fault symptoms and signals, it is necessary to extract clear fault feature information on the premise of eliminating noise interference and improving signal-to-noise ratio as much as possible when diagnosing gearbox faults. The common vibration signal processing methods include detailed spectrum analysis, cepstrum analysis, time domain synchronous averaging method, adaptive denoising technology, resonance demodulation method and signal deconvolution. However, due to the influence of complex noise interference in the actual signal acquisition process, these signal processing methods cannot extract the fault characteristics of the gearbox gear well. In addition, in practical applications, most signal processing methods based on spectrum analysis will be constrained by the limited system signal availability. For example, when the wireless vibration sensor is used to monitor the condition of the gearbox device of rotating machinery, the length of the obtained signal sequence may be too short due to the limitation of power consumption, communication bandwidth and storage, which leads to the poor frequency resolution of the signal spectrum, which cannot meet the requirements of spectrum analysis at all, and thus cannot accurately identify the gearbox gear fault.

SUMMARY

To address the above-mentioned issues in the prior art, the present disclosure provides a gear fault diagnosis method based on joint weighted envelope noise-resistant correlation of sub-signals, which can detect and diagnose the gear fault of a gearbox device of rotating machinery based on vibration acceleration signal analysis under the circumstances of limited system signal availability and complex noise interference.

The technical solution of the present disclosure is as follows:

A gear fault diagnosis method based on joint weighted envelope noise-resistant correlation of sub-signals, comprising the following steps:

Step 1, collecting, by a vibration acceleration sensor, a signal sequence from a gearbox device of rotating machinery;

Step 2, performing element-wise squaring on the collected signal sequence, to obtain a square sequence of a discrete vibration acceleration signal;

Step 3, performing a low-pass filter on the square sequence of the discrete vibration acceleration signal;

Step 4, computing a square root of the discrete vibration acceleration signal after the low-pass filter to obtain an envelope signal of an original signal;

Step 5, reconstructing the direct envelope signal according to different time intervals to obtain a series of sub-signals;

Step 6, calculating a fault information representation measure of each sub-signal based on a L-moment theoretical index;

Step 7, assigning a weight to each sub-signal based on the fault information representation measure and Sigmoid transformation;

Step 8, calculating a joint weighted envelope noise-resistant correlation function of an envelope signal sequence and the reconstructed sub-signals based on the envelope signal in the step 4, the reconstructed sub-signals in the step 5 and the weights of the sub-signals in the step 7;

Step 9, drawing a variation diagram of the joint weighted envelope noise-resistant correlation function with the time interval; and Step 10, determining a characteristic frequency based on a reciprocal of a time interval value corresponding to a characteristic peak in the variation diagram drawn in the step 9, and further identifying a gear fault to issue an early warning to a staff by a main control unit.

Further, in the step 1, the collected signal sequence is recorded as s(t), t=1, 2, 3, ..., N, where N represents a total number of sampling points, and a sampling frequency is recorded as $f_s$; a frequency response parameter of the vibration acceleration sensor is not less than 2 kHz, the sampling frequency $f_s$ of the signal sequence is not less than 5.12 kHz and not more than 64 kHz, and the total number of sampling points satisfies $\max\{f_s/10, \min\{f_s/8, 2f_s/Fr\}\} \leq N \leq f_s/2$, where Fr represents a lowest rotational speed of all rotating shafts of the gearbox device to be tested.

Further, in the step 3, the low-pass filter with a stopband attenuation of 60 dB is used to perform a zero-phase filter on the discrete vibration acceleration signal, and a cutoff frequency $\omega_{FL}$ of the low-pass filter is 500 Hz.

Further, a calculation equation of the step 5 is as follows:

$$\vartheta_T(t) = \begin{cases} \frac{1}{m}\sum_{j=0}^{m-1} y(t+jT), & 1 \leq t < T \\ \vartheta_T(t - \lfloor t/T \rfloor T), & T \leq t \leq N \end{cases},$$

where $\lfloor \cdot \rfloor$ represents a round down operator, the time interval T is a positive integer and $1 \leq T \leq \lfloor N/2 \rfloor$, $m = \lfloor N/T \rfloor$ represents a reconstruction coefficient of sub-signal $\vartheta_T(t)$; and y(t) represents the envelope signal.

Further, a calculation equation of the fault information representation measure $LI_T$ in the step 6 is as follows:

$$LI_T = |\mathcal{L}s(\vartheta_T(t))| \times [\mathcal{L}k(\vartheta_T(t))],$$

where $\mathcal{L}s(\vartheta_T(t))$ and $\mathcal{L}k(\vartheta_T(t))$ represent a L-skewness and a L-kurtosis of each sub-signal $\vartheta_T(t)$, respectively, and are calculated by a L-moment theory, respectively:

$$\mathcal{L}s(\vartheta_T(t)) = \frac{\lambda_3(\vartheta_T(t))}{\lambda_2(\vartheta_T(t))},$$

$$\mathcal{L}k(\vartheta_T(t)) = \frac{\lambda_4(\vartheta_T(f))}{\lambda_2(\vartheta_T(f))},$$

where $\lambda_r(\vartheta_T(t))$ represents a rth-order L-moment related to the sub-signal $\vartheta_T(t)$.

Further, a calculation process of the rth-order L-moment related to the sub-signals $\vartheta_T(t)$ is as follows:

Assuming that $X=[X_1, X_2, \ldots, X_n]$ is a continuous independent sample of size n from a cumulative distribution F(x), and letting $X_{1:n} \leq X_{2:n} \leq \cdots \leq X_{n:n}$ be the order statistics of a random variable drawn from X. The rth-order L-moment $\lambda_r$ of the independent sample X is calculated as:

$$\lambda_r = \frac{1}{r}\sum_{k=0}^{r-1}(-1)^k\binom{r-1}{k}E(X_{(r-k):r}), r = 1, 2, \ldots,$$

where $E(X_{(r-k):r})$ represents an expectation of an order statistics $X_{(r-k):r}$, and is defined as:

$$E(X_{j:r}) = \frac{r!}{(j-1)!(r-j)!}\int_0^1 x[F(x)]^{j-1}[1-F(x)]^{r-j}dF(x).$$

Further, a calculation equation of the step 7 is:

$$\mathcal{W}_T = \text{Sigmoid}(LI_T) = \frac{1}{1 + e^{-(\gamma * LI_T + \nu)}},$$

where $\gamma$ and $\nu$ represent a scaling coefficient and an offset coefficient, respectively.

Further, an equation for calculating the joint weighted envelope noise-resistant correlation function $\mathcal{W}\vartheta g(T)$ in the step 8 is as follows:

$$\mathcal{W}\vartheta g(T) = \left(\frac{m}{m + (\mathcal{W}_T - 2)\mathcal{W}_T}\right)\frac{1}{T}\sum_{t=1}^{T}\vartheta_T^2(t) - \frac{1}{(m + (\mathcal{W}_T - 2)\mathcal{W}_T)mT}\sum_{t=1}^{mT}y^2(t).$$

Further, in the step 10, the time interval T corresponding to the characteristic peak in the variation diagram drawn in the step 9 is an integer multiple of reciprocal values of a fundamental frequency of the characteristic frequency of the gear fault and higher harmonic frequencies of the characteristic frequency of the gear fault.

Further, the scaling coefficient $\gamma$ is 100 and the offset coefficient $\nu$ is 0.

Compared with the prior art, the present disclosure has the following beneficial effects:

In view of the deficiencies and shortcomings of the existing gear fault diagnosis technologies of rotating machinery gearbox device under the circumstances of limited system signal availability and complex noise interference, the present disclosure proposes a vibration acceleration signal analysis technology, which includes the following steps: firstly, converting an original vibration signal sequence into an envelope signal through a signal sequence element-wise squaring-low-pass filtering-square root computation process, then reconstructing the envelope signal according to different time intervals to obtain a series of sub-signals, and calculating a fault information representation measure of each sub-signal based on an L-moment theoretical index; subsequently, assigning a weight to each sub-signal with Sigmoid transformation, and calculating a joint weighted envelope noise-resistant correlation function of the envelope signal sequence and the reconstructed sub-signals based on the envelope signal, the reconstructed sub-signals and the corresponding weights thereof, and finally determining a characteristic frequency according to a reciprocal of a time interval value corresponding to the characteristic peak in a plot of the joint weighted envelope noise-resistant correlation function with the time interval to eventually identifying a gear fault. The method is suitable for gear fault diagnosis and analysis of gearbox device of rotating machinery system, and it can realize reliable identification of gear fault only based on time domain analysis technology of vibration acceleration signals without prior information. This method is a nonparametric method, and the diagnosis process does not depend on spectrum analysis technology, which is suitable for situations where the signal acquisition length is limited when the equipment status is monitored in the actual industrial field, that is, limited system signal availability constraints, and has excellent robustness to inevitable complex noise interference in the process of signal acquisition and signal conversion processing in the industrial environment, and thus is of great significance to practical engineering applications.

DESCRIPTION OF EMBODIMENTS

The object and effect of the present disclosure will become more apparent by describing the present disclosure in detail below with reference to the attached drawings and preferred embodiments. It should be appreciated that the specific embodiments described here are only for explaining the present disclosure and are not intended to limit the present disclosure.

The present disclosure relates to a gear fault diagnosis method based on joint weighted envelope noise-resistant correlation of sub-signals. Based on vibration acceleration signal analysis, firstly, an original vibration signal sequence is converted into an envelope signal through a signal sequence element-wise squaring-low-pass filtering-square root computation process, then an envelope signal is reconstructed according to different time intervals to obtain a series of sub-signals, and a fault information representation measure of each sub-signal is calculated based on an L-moment theoretical index; subsequently, a weight is assigned to each sub-signal with Sigmoid transformation, and a joint weighted envelope noise-resistant correlation function of the envelope signal sequence and the reconstructed sub-signals is calculated based on the envelope signal, the reconstructed sub-signals and the corresponding weights thereof, and finally a characteristic frequency is determined according to a reciprocal of a time interval value corresponding to the characteristic peak in a plot of the joint weighted envelope noise-resistant correlation function with the time interval to eventually identifying a gear fault. Therefore, the gear failure of a gearbox can be detected and diagnosed under the circumstances of limited system signal availability and complex noise interference, and important technical support may be for ensuring the timely monitoring and control, safe and efficient operation and maintenance of the gearbox device in rotating machinery system.

Figure 1:
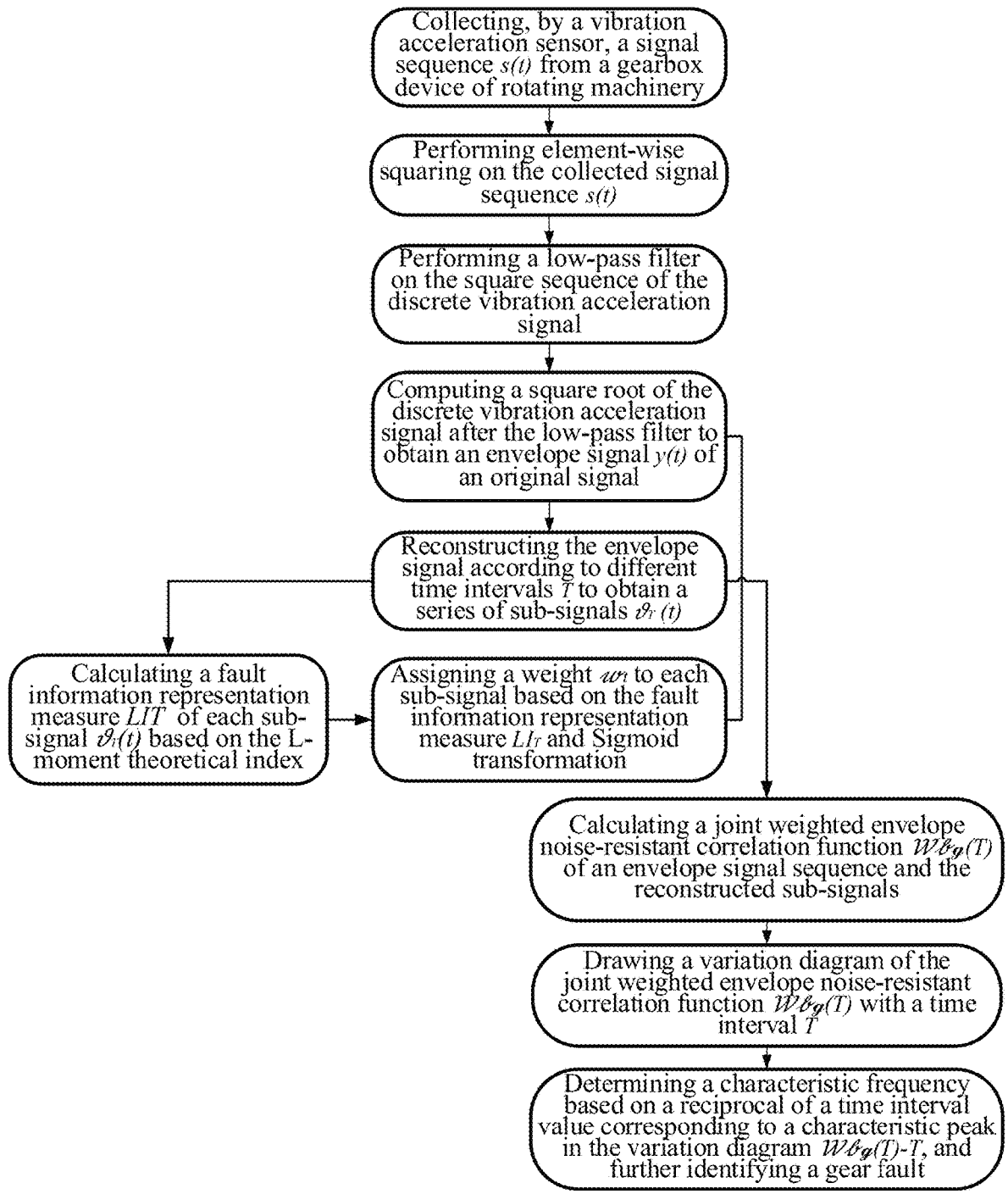
FIG. 1 is a schematic flow chart of a gear fault diagnosis method based on joint weighted envelope noise-resistant correlation of sub-signals according to the present disclosure.

As shown in FIG. 1, the method of the present disclosure specifically includes the following steps:

Step 1: a signal sequence is collected from a gearbox device of rotating machinery by a vibration acceleration sensor.

In an example, the vibration acceleration sensor is rigidly connected with the gearbox device of the target rotating machinery. After a vibration signal sequence with a certain time duration is collected, the collected vibration signal sequence is transmitted to a data acquisition unit based on wireless communication or wired transmission mode conforming to the ISO standard protocol. Then the data acquisition unit converts the vibration signal sequence from an analog signal type to a digital signal type, and transmits the vibration signal sequence that has been converted to the digital signal type to a memory where a main control unit is located through the wireless communication or wired transmission mode conforming to the ISO standard protocol, thereby completing the data acquisition process of the vibration acceleration signal sequence.

In this step, the collected signal sequence is recorded as $s(t)$, $t=1,2,3,\ldots,N$, where N represents a total number of sampling points, and a sampling frequency is recorded as $f_s$. In the process of signal acquisition, the frequency response parameter of the vibration acceleration sensor should be not less than 2 kHz, the sampling frequency $f_s$ of the vibration signal sequence should be not less than 5.12 kHz and not more than 64 kHz. The number of sampling points should satisfy $\max\{f_s/10,\min\{f_s/8, 2f_s/Fr\}\}\leq N\leq f_s/2$, where Fr represents the lowest rotational speed of all rotating shafts of the gearbox device to be tested.

Step 2, element-wise squaring is performed on the signal sequence $s(t)$ collected by the vibration acceleration sensor, to obtain $S(t)=s^2(t)$, $t=1, 2, 3,\ldots,N$.

Step 3, a low-pass filter is performed on the square sequence $S(t)$ of the discrete vibration acceleration signal, as follows:

$$\tilde{S}(t)=\mathrm{Filter}_L(S(t),\omega_{FL}),$$

where $\mathrm{Filter}_L(\bullet)$ represents an operator for performing a low-pass filter on the discrete signal, $\omega_{FL}$ represents a cut-off frequency of low-pass filtering, and $\tilde{S}(t)$, $t=1,2,3,\ldots,N$ is the signal sequences obtained after low-pass filtering. In the step 3, a low-pass filter with a stopband attenuation of 60 dB is used to perform a zero-phase filter on the vibration signal, and the low-pass filter attenuates the frequency lower than the specified passband frequency, which can compensate the delay introduced by the digital filter. Considering the practical application effect, the cut-off frequency a)$_{FL}$ of low-pass filtering is set to 500 Hz.

Step 4, a square root of the discrete vibration acceleration signal after the low-pass filter is computed to obtain a direct envelope signal y(t), t=1, 2, 3, . . . , N of the original signal, as follows:

$$y(t) = \sqrt{\tilde{S}(t)}.$$

The theoretical feasibility analysis process of converting the discrete vibration acceleration signal sequence s(t) into the envelope signal y(t) through the operation in the step 2 to the step 4 is as follows:

(1) For a standard modulated signal $x_0(t)$, its most basic form can be modeled as a product of a single-component low-frequency signal $x_L(t)$ and a single-component high-frequency signal $x_H(t)$, and can be expressed as:

$$x_0(t)=x_L(t)\times x_H(t)=(U_L\cos(\omega_L t)+V)\times U_H\cos(\omega_H t),$$

where V represents a DC component to ensure $U_L\cos(\omega_L t)+V>0$, $U_L$ and $\omega_L$ represent the amplitude and frequency of the single-component low-frequency signal $x_L(t)$, respectively, and $U_H$ and $\omega_H$ represent the amplitude and frequency of the single-component high-frequency signal $x_H$ (t), respectively.

(2) The modulated signal $x_0(t)$ is squared to obtain:

$$x_0^2(t) = ((U_L\cos(\omega_L t) + V) \times U_H\cos(\omega_H t))^2 =$$

$$U_L^2 U_H^2 \cos^2(\omega_L t)\cos^2(\omega_H t) + 2VU_L U_H^2 \cos(\omega_L t)\cos^2(\omega_H t) +$$

$$V^2 U_H^2 \cos^2(\omega_H t) = \frac{1}{4}U_L^2 U_H^2(1+\cos(2\omega_L t)) + \frac{1}{4}U_L^2 U_H^2 \cos(2\omega_H t) +$$

$$\frac{1}{8}U_L^2 U_H^2(\cos((2\omega_H - 2\omega_L)t) + \cos((2\omega_H + 2\omega_L)t)) +$$

$$VU_L U_H^2 \cos(\omega_L t) + \frac{1}{2}VU_L U_H^2(\cos((2\omega_H - \omega_L)t) + \cos((2\omega_H + \omega_L)t)) +$$

$$\frac{1}{2}V^2 U_H^2 + \frac{1}{2}V^2 U_H^2 \cos(2\omega_H t).$$

Commonly, $\omega_H$ is much larger than $\omega_L$, and the frequency components of $2\omega_H$, $(2\omega_H+2\omega_L)$, $(2\omega_H-2\omega_L)$, $(2\omega_H+\omega_L)$ and $(2\omega_H-\omega_L)$ can be filtered out after passing through a low-pass filter with cut-off frequency $\omega_{FL}$ lower than $(2\omega_H-2\omega_L)$, as follows:

$$\tilde{X}(t) = \text{Filter}_L(x_0^2(t), \omega_{FL}) =$$

$$\frac{1}{4}U_L^2 U_H^2(1+\cos(2\omega_L t)) + VU_L U_H^2 \cos(\omega_L t) + \frac{1}{2}V^2 U_H^2 =$$

$$\frac{1}{2}(U_L U_H \cos(\omega_L t) + V U_H)^2.$$

(3) The envelope signal can be obtained via compute the square root of the filtered signal $\tilde{X}(t)$ after low-pass filtering is computed, as follows:

$$x(t) = \sqrt{\tilde{X}(t)} = \frac{U_H}{\sqrt{2}}(U_L\cos(\omega_L t) + V).$$

It can be found that the original signal $x_0(t)$ and the obtained envelope signal x(t) differ only by a constant multiple $\sqrt{2}$ in the low frequency amplitude. If the envelope signal x(t) is regarded as a bounded signal sequence guided by the fault period, the overall scaling of the amplitude has no effect on the diagnosis result of the gearbox gear.

For the actually collected signal s(t), it will inevitably be affected by noise, and thus can be modeled as:

$$s(t)=x_0(t)+w_0(t).$$

After the square-low-pass filtering-square root computation process of the above signal, the obtained direct envelope signal y(t) can be similarly expressed as:

$$y(t)=x(t)+w(t),$$

where $w_0(t)$ and w(t) represent random noise signals, respectively.

Therefore, the implementing process of converting the signal sequence s(t) containing random noise into the envelope signal y(t) containing random noise through the operation from the step 2 to the step 4 is reasonable.

Step 5, the envelope signal y(t) is reconstructed according to different time intervals to obtain a series of sub-signals $\vartheta_T(t)$, as follows:

$$\vartheta_T(t) = \begin{cases} \frac{1}{m}\sum_{j=0}^{m-1} y(t+jT), & 1 \le t < T \\ \vartheta_T(t - \lfloor t/T \rfloor T), & T \le t \le N \end{cases},$$

where $\lfloor \cdot \rfloor$ represents a round down operator, the time interval T is a positive integer, and $1 \le T \le \lfloor N/2 \rfloor$, and $m = \lfloor N/T \rfloor$ represents the reconstruction coefficient of the sub-signal $\vartheta_T(t)$.

Step 6, the fault information representation measure $LI_T$ of each sub-signal $\vartheta_T(t)$ is calculated based on the L-moment theoretical index, as follows:

$$LI_T = |\mathcal{LS}(\vartheta_T(t))| \times |\mathcal{LK}(\vartheta_T(t))|,$$

where $\mathcal{LS}(\vartheta_T(t))$ and $\mathcal{LK}(\vartheta_T(t))$ represent the L-skewness and L-kurtosis of the sub-signal $\vartheta_T(t)$, respectively, which are calculated by the L-moment theory, respectively:

$$\mathcal{LS}(\vartheta_T(t)) = \frac{\lambda_3(\vartheta_T(t))}{\lambda_2\vartheta\vartheta_T(t))},$$

$$\mathcal{LK}(\vartheta_T(t)) = \frac{\lambda_4(\vartheta_T(t))}{\lambda_2(\vartheta_T(t))},$$

where $\lambda_r(\vartheta_T(t))$ represents a rth-order L-moment related to the signal sequence or$_T$(t).

In the step 6, the computation process of the rth-order L-moment related to the signal sequence is as follows:

Assuming that $X=[X_1, X_2, \ldots, X_n]$ is a series of continuous independent sample sequences of size n from a cumulative distribution F(x), and letting $X_{1:n} \le X_{2:n} \le \cdots \le X_{n:n}$ be the order statistics of a random variable drawn from X, then the rth-order L-moment $\lambda_r$ of the independent sample X can be defined as:

$$\lambda_r = \frac{1}{r}\sum_{k=0}^{r-1}(-1)^k \binom{r-1}{k} E(X_{(r-k):r}), r = 1, 2, \ldots,$$

where $E(X_{(r-k):r})$ represents an expectation of an order statistics $X_{(r-k):r}$, which may be defined as:

$$E(X_{j:r}) = \frac{r!}{(j-1)!(r-j)!} \int_0^1 x[F(x)]^{j-1}[1-F(x)]^{r-j} dF(x).$$

Thus, the 2th-order to 4th-order L moments used in the present disclosure can be calculated as:

$$\lambda_2 = \frac{1}{2} E(X_{2:2} - X_{1:2}) = \int_0^1 x(2F(x) - 1) dF(x),$$

$$\lambda_3 = \frac{1}{3} E(X_{3:3} - 2X_{2:3} + X_{1:3}) = \int_0^1 x(6F^2(x) - 6F(x) + 1) dF(x),$$

$$\lambda_4 = \frac{1}{4} E(X_{4:4} - 3X_{3:4} + 3X_{2:4} - X_{1:4}) =$$

$$\int_0^1 x(20F^3(x) - 30F^2(x) + 12F(x) - 1) dF(x).$$

Step 7, a weight $w_T$ is assigned to each sub-signal $\vartheta_T(t)$ based on the fault information representation measure $LI_T$ and Sigmoid transformation, and the computation process is as follows:

$$w_T = \text{Sigmoid}(LI_T) = \frac{1}{1 + e^{-(\gamma * LI_T + \nu)}},$$

where $\gamma$ and $\nu$ stand for the scaling coefficient and the offset coefficient, respectively. In the present disclosure, according to the numerical range characteristics of $LI_T$ index and the practical application of this method in gearbox gear fault diagnosis, the scaling coefficient $\gamma$ is 100 and the offset coefficient $\nu$ is 0.

Step 8, based on the envelope signal y(t), the reconstructed sub-signals $\vartheta_T(t)$ and the corresponding weights $w_T$, the joint weighted envelope noise-resistant correlation function $W\&g(T)$ of the envelope signal sequence and the reconstructed sub-signals is calculated, as follows:

$$W\&g(T) =$$

$$\left(\frac{m}{m + (w_T - 2)w_T}\right) \frac{1}{T} \sum_{t=1}^{T} \vartheta_T^2(t) - \frac{1}{(m + (w_T - 2)w_T)mT} \sum_{t=1}^{mT} y^2(t).$$

Step 9, the variation diagram of the calculated joint weighted envelope noise-resistant correlation function $W\&g(T)$ with time interval is drawn.

Step 10, the characteristic frequency is determined based on the reciprocal of the time interval value corresponding to the characteristic peak in the diagram drawn in the step 9, and the gear fault is further identified. Moreover, the time interval T corresponding to the characteristic peak of the concerned diagram $W\&g(T)-T$ should be an integer multiple of the reciprocal values of the fundamental frequency of the characteristic frequency of the gear fault and its higher harmonic frequencies thereof.

If it is determined, based on the judgment logic, preset value, symbolic relationship and other conditions, that the time interval T corresponding to the characteristic peak in the diagram drawn in the step 9 is an integer multiple of the reciprocal values of the fundamental frequency of the characteristic frequency of the gear fault and its higher harmonic frequencies thereof, the main control unit gives an early warning to the staff, indicating that the gear of the gearbox device of the target rotating machinery may have a fault, and the staff will stop and check the target rotating machinery device in time according to the instruction. By changing gears, gear pairs or gearboxes, changing lubricating oil and other measures, the timely and reasonable operation and maintenance of gear failures of the gearbox device of the target rotating machinery can be completed, thereby obtaining the rotating machinery device without gearbox failure, and ensuring the safe, stable and efficient operation of the engineering machinery system.

Figure 2:
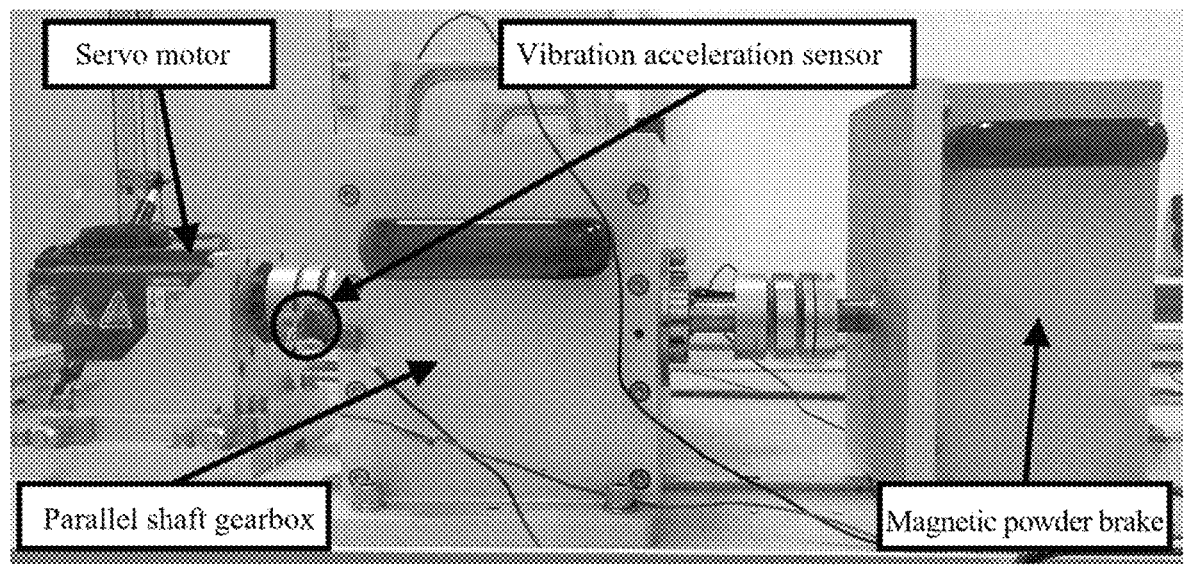
FIG. 2 is a schematic diagram of collecting the vibration signal sequence from a parallel shaft gearbox device in a rotating machinery system using a vibration acceleration sensor, according to an embodiment of the present disclosure.
Figure 3:
FIG. 3 is a schematic diagram of a faulty bull gear with a worn tooth in the parallel shaft gearbox according to an embodiment of the present disclosure.
Figure 4:
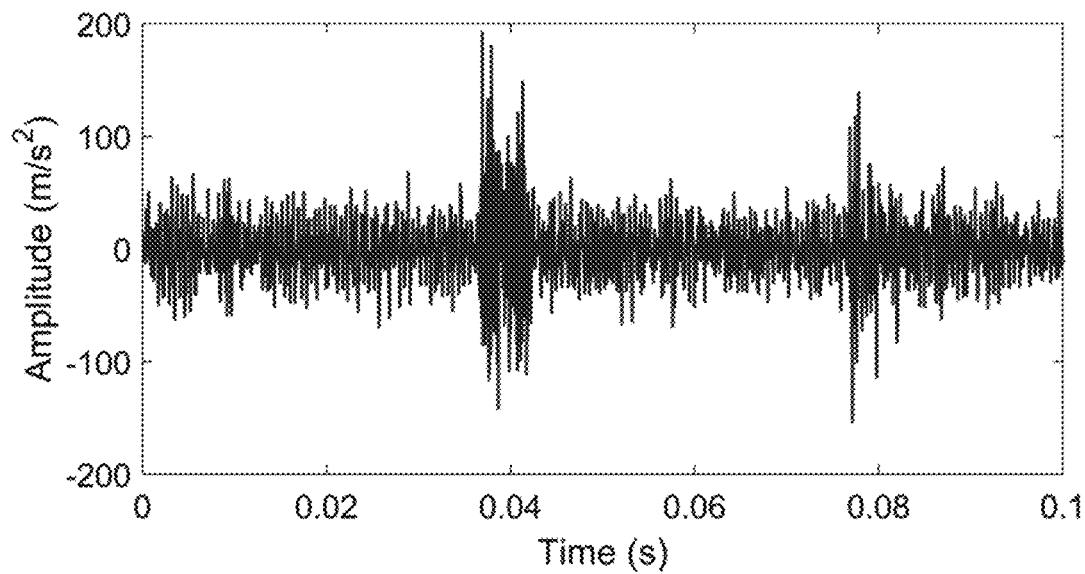
FIG. 4 is a schematic diagram of an original vibration signal collected according to an embodiment of the present disclosure.

Next, an example of diagnosing and analyzing the gear fault signal of a gearbox device by using the method of the present disclosure is given. The specific process of this embodiment is as follows:

S01, a vibration signal sequence is collected from the parallel shaft gearbox device of the rotating machinery system through a vibration acceleration sensor. As shown in FIG. 2, the rotating machinery testing system is mainly composed of a servo motor, a parallel shaft gearbox and a magnetic powder brake. The number of pinion teeth in the parallel shaft gearbox is 30, and the number of bull gear teeth is 70, and there is a wear fault in one tooth of the bull gear, as shown in FIG. 3. The servo motor drives the pinion to rotate at 3500 rpm, and the loading value of the magnetic powder brake is set to 8 N·m. During the experiment, the sampling frequency of the vibration acceleration sensor is set to 50000 Hz, the sampling duration is 0.1 s, and the sampling points are 5000. The vibration signal sequence collected by the vibration acceleration sensor is shown in FIG. 4. Moreover, it can be calculated from the above that the fault characteristic frequency $f_G$ corresponding to bull gear wear is equal to the rotating frequency of the shaft where it is located, which is 3500/60*30/70 Hz=25 Hz.

S02, element-wise squaring is performed on the collected discrete vibration acceleration signal sequence to obtain a square sequence of the discrete vibration acceleration signal.

S03, low-pass filtering is performed on the square sequence of the discrete vibration acceleration signal.

Figure 5:
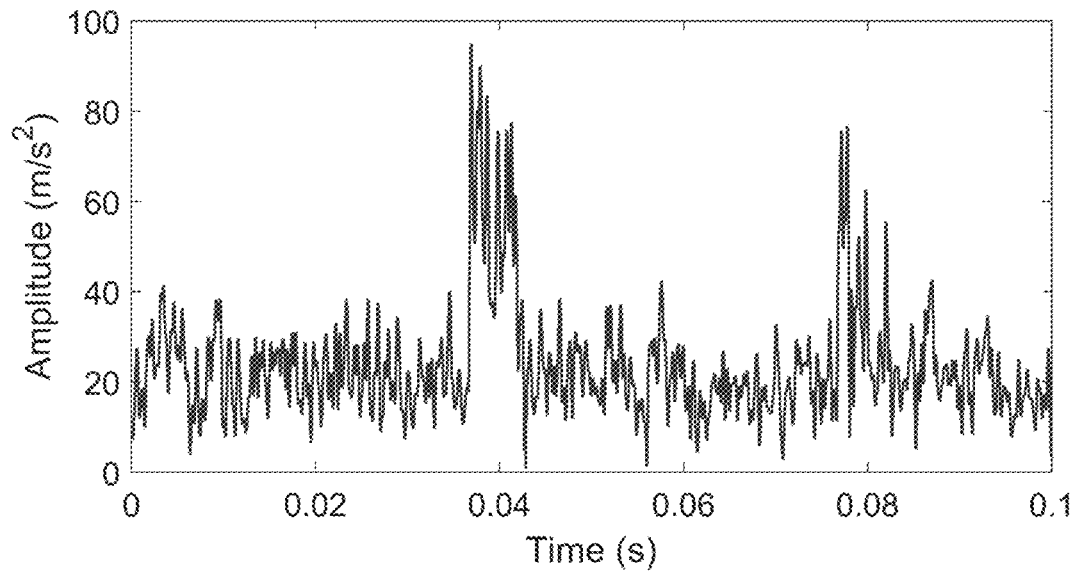
FIG. 5 is a schematic diagram of converting an original vibration signal sequence into an envelope signal by a signal sequence element-wise square-low-pass filtering-square root computation process according to an embodiment of the present disclosure.

S04, a square root of the low-pass filtered signal is computed to obtain a direct envelope signal of the original signal, as shown in FIG. 5.

S05, reconstructing an envelope signal according to different time intervals T to obtain a series of sub-signals. In this embodiment, the number of reconstructed sub-signals is $\lfloor N/2 \rfloor = \lfloor 5000/2 \rfloor = 2500$.

S06, a fault information representation measure of each sub-signal is calculated based on the L-moment theoretical index.

S07, a weight is assigned to each sub-signal based on the fault information representation measure and Sigmoid transformation.

S08, a joint weighted envelope noise-resistant correlation function $W\&g(T)$ of the envelope signal sequence and the reconstructed sub-signals is calculated based on the envelope signal, the reconstructed sub-signals and the corresponding weights thereof.

Figure 6:
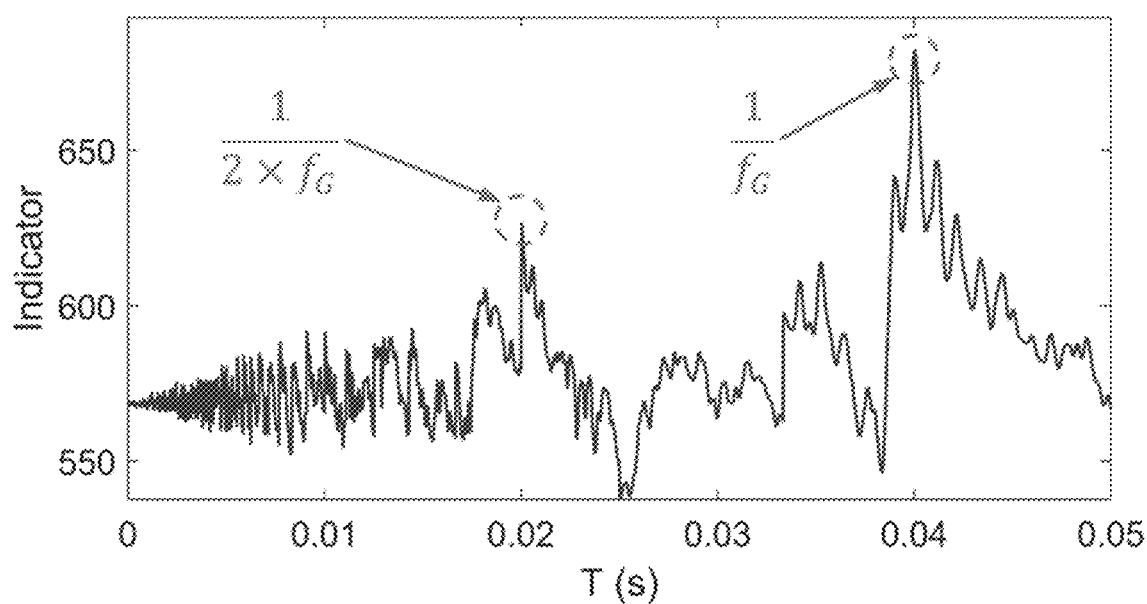
FIG. 6 is a schematic diagram of the variation of the joint weighted envelope noise-resistant correlation function with the time interval calculated based on the envelope signal, the reconstructed sub-signals and the corresponding weights according to an embodiment of the present disclosure.

S09, a variation diagram of the joint weighted envelope noise-resistant correlation function $W\&g(T)$ with the time interval T is drawn, as shown in FIG. 6.

S10, as can be observed from the diagram of $W\&g(T)-T$ shown in FIG. 6, there are two obvious peaks, and the corresponding time intervals of 0.04 s and 0.02 s are just the reciprocal of the bull gear wear fault frequency $f_G=25$ Hz and its double harmonic frequency $2 \times f_G=50$ Hz, respectively. Therefore, it can be determined that the bull gear of the gearbox is faulty. The main control unit sends an early warning to the staff, indicating that the gear of the parallel shaft gearbox device of the rotating machinery system may have a fault. The staff promptly shuts down the parallel shaft gearbox device for inspection according to the instructions, and completes the timely and reasonable operation and maintenance of the gear fault of the parallel shaft gearbox device by replacing the gear, gear pair or gearbox, replacing the lubricating oil and other measures, thereby obtaining a parallel shaft gearbox device without gear fault.

It can be understood by those skilled in the art that the above is only a preferred embodiment of the present disclosure, and it is not intended to limit the present disclosure. Although the present disclosure has been described in detail with reference to the above embodiment, it is still possible for those skilled in the art to modify the technical solution described in the above embodiment or make equivalent substitutions on some technical features. Any modification and equivalent substitutions within the spirit and principle of the present disclosure should fall into the scope of protection of the present disclosure.

What is claimed is:

1. A gear fault diagnosis method based on joint weighted envelope noise-resistant correlation of sub-signals, comprising:

step 1, collecting, by a vibration acceleration sensor, a signal sequence from a gearbox device of rotating machinery;

step 2, performing element-wise squaring on the collected signal sequence, to obtain a square sequence of a discrete vibration acceleration signal;

step 3, performing a low-pass filter on the square sequence of the discrete vibration acceleration signal;

step 4, computing a square root of the discrete vibration acceleration signal after the low-pass filter to obtain an envelope signal of an original signal;

step 5, reconstructing the envelope signal according to different time intervals to obtain a series of sub-signals;

step 6, calculating a fault information representation measure of each of the series of sub-signals based on a L-moment theoretical index;

step 7, assigning a weight to each of the series of sub-signals based on the fault information representation measure and Sigmoid transformation;

step 8, calculating a joint weighted envelope noise-resistant correlation function of an envelope signal sequence and the reconstructed series of sub-signals based on the envelope signal from the step 4, the reconstructed sub-signals from the step 5 and the weights of the series of sub-signals from the step 7;

step 9, drawing a variation diagram of the joint weighted envelope noise-resistant correlation function with a time interval; and step 10, determining a characteristic frequency based on a reciprocal of a time interval value corresponding to a characteristic peak in the variation diagram drawn in the step 9, and identifying a gear fault to issue an early warning to a staff by a main control unit;

wherein in the step 1, the collected signal sequence is recorded as $s(t)$, $t=1,2,3,\ldots,N$, where N represents a total number of sampling points, and a sampling frequency is recorded as $f_s$; a frequency response parameter of the vibration acceleration sensor is not less than 2 kHz, the sampling frequency $f_s$ of the signal sequence is not less than 5.12 kHz and not more than 64 kHz, and the total number of sampling points satisfies $\max\{f_s/10, \min\{f_s/8, 2f_s/Fr\}\} \leq N \leq f_s/2$, where Fr represents a lowest rotational speed of all rotating shafts of the gearbox device to be tested.

2. The gear fault diagnosis method based on the joint weighted envelope noise-resistant correlation of the sub-signals according to claim 1, wherein in the step 3, the low-pass filter with a stopband attenuation of 60 dB is used to perform a zero-phase filter on the discrete vibration acceleration signal, and a cutoff frequency $\omega_{FL}$ of the low-pass filter is 500 Hz.

3. The gear fault diagnosis method based on the joint weighted envelope noise-resistant correlation of the sub-signals according to claim 1, wherein a calculation equation of the step 5 is as follows:

$$\vartheta_T(t) = \begin{cases} \frac{1}{m}\sum_{j=0}^{m-1} y(t+jT), & 1 \leq t < T \\ \vartheta_T(t - \lfloor t/T \rfloor T), & T \leq t \leq N \end{cases},$$

where $\lfloor \cdot \rfloor$ represents a round down operator, the time interval T is a positive integer and $1 \leq T \leq \lfloor N/2 \rfloor$, $m = \lfloor N/T \rfloor$ represents a reconstruction coefficient of sub-signals $\vartheta_T(t)$; and $y(t)$ represents the envelope signal.

4. The gear fault diagnosis method based on the joint weighted envelope noise-resistant correlation of the sub-signals according to claim 3, wherein a calculation equation of the fault information representation measure $LI_T$ in the step 6 is as follows:

$$LI_T = |\mathcal{L}s(\vartheta_T(t))| \times [\mathcal{L}k(\vartheta_T(t))],$$

where $\mathcal{L}s(\vartheta_T(t))$ and $\mathcal{L}k(\vartheta_T(t))$ represent a L-skewness and a L-kurtosis of the sub-signals $\vartheta_T(t)$, respectively, and are calculated by a L-moment theory, respectively:

$$\mathcal{L}s(\vartheta_T(t)) = \frac{\lambda_3(\vartheta_T(t))}{\lambda_2 \vartheta \theta_T(t))},$$

$$\mathcal{L}k(\vartheta_T(t)) = \frac{\lambda_4(\vartheta_T(t))}{\lambda_2(\vartheta_T(t))},$$

where $\lambda_r(\vartheta_T(t))$ represents a rth-order L-moment related to the sub-signal $\vartheta_T(t)$.

5. The gear fault diagnosis method based on the joint weighted envelope noise-resistant correlation of the sub-signals according to claim 4, wherein a calculation process of the rth-order L-moment related to the sub-signal $\vartheta_T(t)$ is as follows:

assuming that $X=[X_1, X_2, \ldots, X_n]$ is a continuous independent sample of size n from a cumulative distribution $F(x)$, and letting $X_{1:n} \leq X_{2:n} \leq \cdots \leq X_{n:n}$ be the order statistics of a random variable drawn from X, wherein the rth-order L-moment $\lambda_r$ of the independent sample X is calculated as:

$$\lambda_r = \frac{1}{r}\sum_{k=0}^{r-1}(-1)^k \binom{r-1}{k} E(X_{(r-k):r}), r = 1, 2, \ldots,$$

where $E(X_{(r-k):r})$ represents an expectation of the order statistics $X_{(r-k):r}$, and is defined as:

$$E(X_{j:r}) = \frac{r!}{(j-1)!(r-j)!} \int_0^1 x[F(x)]^{j-1}[1-F(x)]^{r-j} dF(x).$$

6. The gear fault diagnosis method based on the joint weighted envelope noise-resistant correlation of the sub-signals according to claim 5, wherein a calculation equation of the step 7 is as follows:

$$w_T = \text{Sigmoid}(LI_T) = \frac{1}{1+e^{-(\gamma*LI_T+\nu)}},$$

where $\gamma$ and $\nu$ represent a scaling coefficient and an offset coefficient, respectively.

7. The gear fault diagnosis method based on the joint weighted envelope noise-resistant correlation of the sub-signals according to claim 6, wherein an equation for calculating the joint weighted envelope noise-resistant correlation function $W \& g(T)$ in the step 8 is as follows:

$$W \& g(T) = \left(\frac{m}{m+(w_T-2)w_T}\right)\frac{1}{T}\sum_{t=1}^{T}\vartheta_T^2(t) - \frac{1}{(m+(w_T-2)w_T)mT}\sum_{t=1}^{mT}y^2(t).$$

8. The gear fault diagnosis method based on the joint weighted envelope noise-resistant correlation of the sub-signals according to claim 6, wherein the scaling coefficient $\gamma$ is 100 and the offset coefficient $\nu$ is 0.

9. The gear fault diagnosis method based on the joint weighted envelope noise-resistant correlation of the sub-signals according to claim 1, wherein in the step 10, the time interval T corresponding to the characteristic peak in the variation diagram drawn in the step 9 is an integer multiple of reciprocal values of a fundamental frequency of the characteristic frequency of the gear fault and higher harmonic frequencies of the characteristic frequency of the gear fault.

* * * * *